United States Patent
Zellner

(10) Patent No.: US 7,444,589 B2
(45) Date of Patent: Oct. 28, 2008

(54) AUTOMATED PATENT OFFICE DOCUMENTATION

(75) Inventor: Samuel N. Zellner, Dunwoody, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 357 days.

(21) Appl. No.: 11/026,790

(22) Filed: Dec. 30, 2004

(65) Prior Publication Data

US 2006/0150074 A1 Jul. 6, 2006

(51) Int. Cl.
*G06F 17/00* (2006.01)
(52) U.S. Cl. ..................................... 715/255
(58) Field of Classification Search ............... 715/500, 715/530, 200, 255
See application file for complete search history.

(56) References Cited

U.S. PATENT DOCUMENTS

| | | | |
|---|---|---|---|
| 5,465,271 A * | 11/1995 | Hladik et al. | 375/267 |
| 5,774,833 A | 6/1998 | Newman | 704/9 |
| 5,991,751 A | 11/1999 | Rivette et al. | 707/1 |
| 5,991,780 A | 11/1999 | Rivette et al. | 707/512 |
| 6,014,663 A | 1/2000 | Rivette et al. | 707/4 |
| 6,049,811 A | 4/2000 | Petruzzi et al. | 707/507 |
| 6,434,580 B1 | 8/2002 | Takano et al. | 707/530 |
| 6,571,241 B1* | 5/2003 | Nosohara | 707/6 |
| 6,574,645 B2 | 6/2003 | Petruzzi et al. | 707/530 |
| 6,628,310 B1 | 9/2003 | Hiura et al. | 345/776 |
| 6,662,178 B2* | 12/2003 | Lee | 707/3 |
| 6,667,747 B1 | 12/2003 | Spellman et al. | 345/714 |
| 6,701,309 B1* | 3/2004 | Beeferman et al. | 707/3 |
| 7,382,358 B2* | 6/2008 | Kushler et al. | 345/168 |
| 2002/0019836 A1* | 2/2002 | Uchio et al. | 707/511 |
| 2002/0069223 A1* | 6/2002 | Goodisman et al. | 707/513 |
| 2002/0072920 A1* | 6/2002 | Grainger | 705/1 |
| 2002/0078082 A1* | 6/2002 | Petruzzi et al. | 707/500 |
| 2002/0083093 A1* | 6/2002 | Goodisman et al. | 707/511 |
| 2003/0016242 A1* | 1/2003 | Ramahefarivony et al. | 345/738 |
| 2003/0028564 A1* | 2/2003 | Sanfilippo | 707/513 |
| 2004/0168129 A1* | 8/2004 | Roebuck | 715/530 |
| 2005/0108652 A1* | 5/2005 | Beretich et al. | 715/764 |
| 2005/0166137 A1* | 7/2005 | Tran | 715/501.1 |
| 2005/0182755 A1* | 8/2005 | Tran | 707/3 |
| 2005/0210008 A1* | 9/2005 | Tran et al. | 707/3 |
| 2005/0210009 A1* | 9/2005 | Tran | 707/3 |
| 2005/0216320 A1* | 9/2005 | Hattaway | 705/7 |
| 2006/0036529 A1* | 2/2006 | Williams | 705/36 R |
| 2006/0150074 A1* | 7/2006 | Zellner | 715/501.1 |
| 2006/0190807 A1* | 8/2006 | Tran | 715/500 |

(Continued)

OTHER PUBLICATIONS

Rutledge et al., A Framework for Generating Adaptable Hypermedia Documents, ACM 1997, pp. 121-130.*

(Continued)

*Primary Examiner*—Cong-Lac Huynh
(74) *Attorney, Agent, or Firm*—Thomas, Kayden, Horstemeyer, & Risley LLP

(57) ABSTRACT

The present disclosure provides systems and methods for automated patent office documentation. Some embodiments provide for analyzing electronic content such as an issued patent, application for patent, Patent and Trademark Office (PTO) office action, associated patent support data such as PTO information, and/or other reference materials, along with user input to identify references to external information, create an electronic association to the external information, and insert the electronic association into the electronic content.

18 Claims, 4 Drawing Sheets

U.S. PATENT DOCUMENTS

2007/0288498 A1* 12/2007 Dietz et al. .................. 707/102
2008/0117976 A1* 5/2008 Lu et al. ................ 375/240.16

OTHER PUBLICATIONS

Eiron et al., Untangling Compound Documents on the Web, ACM 2003, pp. 85-94.*

Hawking et al., How Valuable is External Link Evidence when Searching Enterprise Webs, ACM 2004, pp. 77-84.*

Handschuh et al., Authoring and Annotation of Web Pages in Cream, ACM May 2002, pp. 462-473.*

* cited by examiner

| Browser |
|---|

⇐ ⇒ X http://www.uspto.gov/officeaction.htm

Application/Control Number: <u>19/959,236</u>
Page 3
Art Unit: 4727

(6). The pocket is comprised of upper and lower flaps attached to the cover as shown in figures 1-3. The upper flap covers the opening of the pocket and a closure such as a zipper (4) connects a portion of the upper flap to the lower flap, as claimed in claims 2 and 3.

6. Claim 4 is rejected under 35 U.S.C. 103(a) as being unpatentable over the reference as applied to claim 1 above, and further in view of Elliot.

The use of elastic to secure storage covers about objects is a well-known expedient as reflected by Elliott. While it isn't clear how the cover of the Japanese patent is secured about the vehicle to have provided it with elastic in a hem or bottom seam to secure it, would have been obvious in view of such teaching by Elliott at 5 and 6.

7. Claim 5 is rejected under 35 U.S.C.103(a) as being unpatentable over Japanese '207.

The claim for a method for storing a "cover for a car" is considered to

FIG. 4

AUTOMATED PATENT OFFICE DOCUMENTATION

TECHNICAL FIELD

This present disclosure is generally related to providing hyperlinks that accesses patent related information.

BACKGROUND

Many of the documents created by the United States Patent and Trademark Office (PTO) reference other documents. Much time and difficult effort are often consumed searching for those references and then locating the specific sections within the document. This unnecessarily complicates and lengthens the patent prosecution process. The references can be found manually either via accessing paper records or through electronic access. The potential exists for many proper references to go undetected.

Therefore, there is a need for systems and methods that address these and/or other perceived shortcomings.

SUMMARY

The present disclosure provides systems and methods for automated patent office documentation. Some embodiments provide for analyzing electronic content such as an issued patent, application for patent, Patent and Trademark Office (PTO) office action, associated patent support data such as PTO information, and/or other reference materials, along with user input to identify references to external information, create an electronic association to the external information, and insert the electronic association into the electronic content.

Other systems, methods, and/or computer program products according to embodiments will be or become apparent to one with skill in the art upon review of the following drawings and detailed description. It is intended that all such additional systems, methods, and/or computer program products be included within this description and be within the scope of the present disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 4 shows a representative office action with electronic associations added as viewed using a web browser.

DETAILED DESCRIPTION

Figure 1:
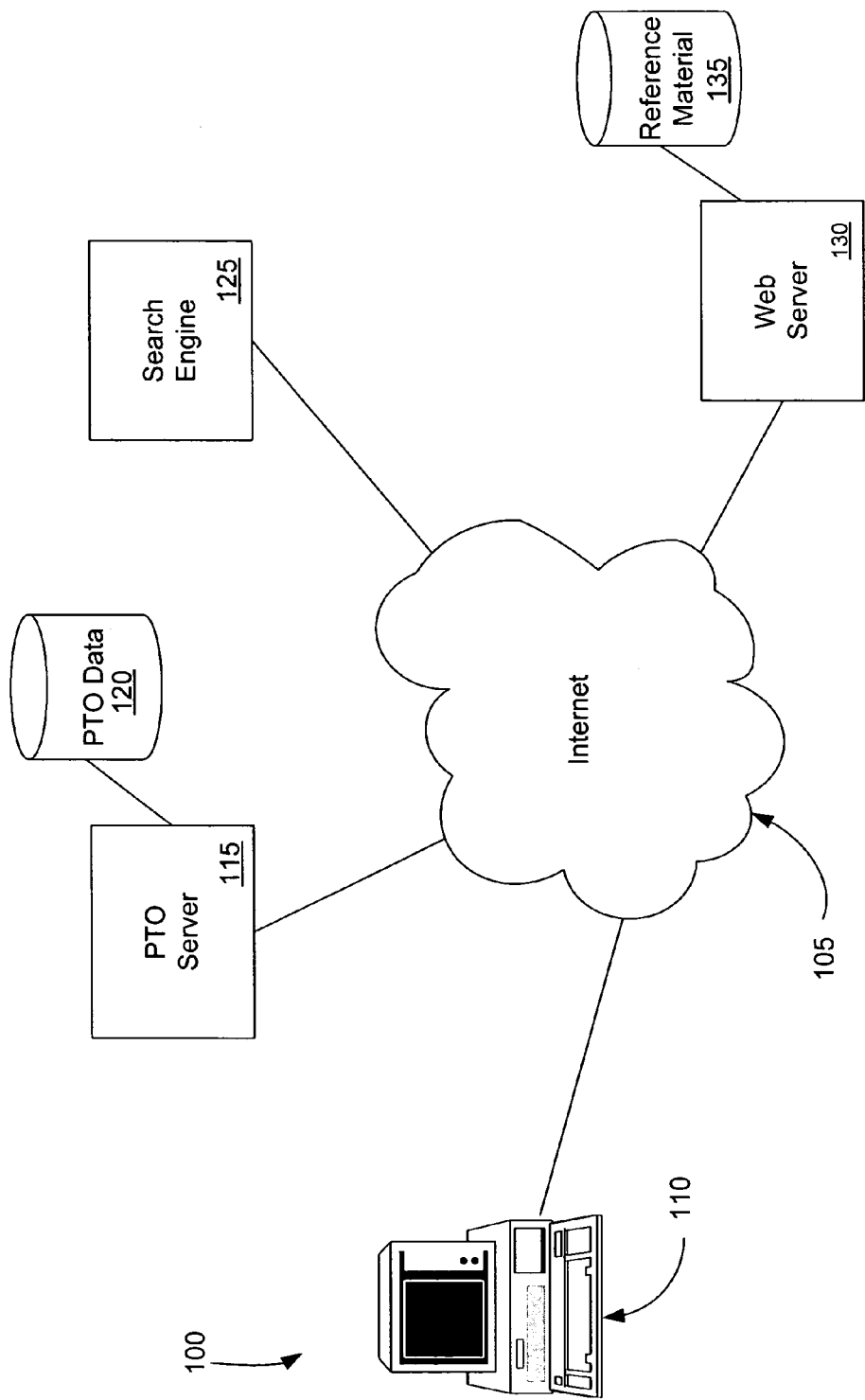
FIG. 1 is a block diagram of an automated patent office documentation system according to an exemplary embodiment.

Reference is now made in detail to the description of the embodiments as illustrated in the drawings. The disclosure may, however, be embodied in many different forms and should not be construed as limited to the embodiments set forth herein; rather, these embodiments are intended to convey the scope of the disclosure to those skilled in the art. Furthermore, all "examples" given herein are intended to be non-limiting.

The present disclosure provides systems and methods for automated patent office documentation. FIG. 1 is a block diagram of one embodiment of the system 100 for inserting electronic associations into patent office documentation. An example of an electronic association is a hyperlink. As shown in FIG. 1, in one embodiment, the automated patent office documentation system 100 resides in one or more general purpose computers 110 that are coupled to sources of public information, e.g., a Patent and Trademark Office (PTO) server 115, a search engine 125, and a web server 130, over a network such as the Internet 105.

In the operating environment shown in FIG. 1, a user of a general purpose computer 110 accesses one or more sources of public information such as PTO information and PTO support data 120 stored in a database, reference materials 135 stored in one or more databases, and information from search engines 125 (including web crawlers and other search logic) over a network such as the Internet 105. The system 100 can be implemented in software, firmware, hardware, or a combination thereof. According to an exemplary embodiment, the system 100 is implemented in software, as an executable program, and is executed by a special or general purpose digital computer 110, such as a personal computer, workstation, minicomputer, or mainframe computer. When implemented in software, the system 100 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the exemplary embodiments in logic embodied in hardware or software-configured mediums.

Figure 2:
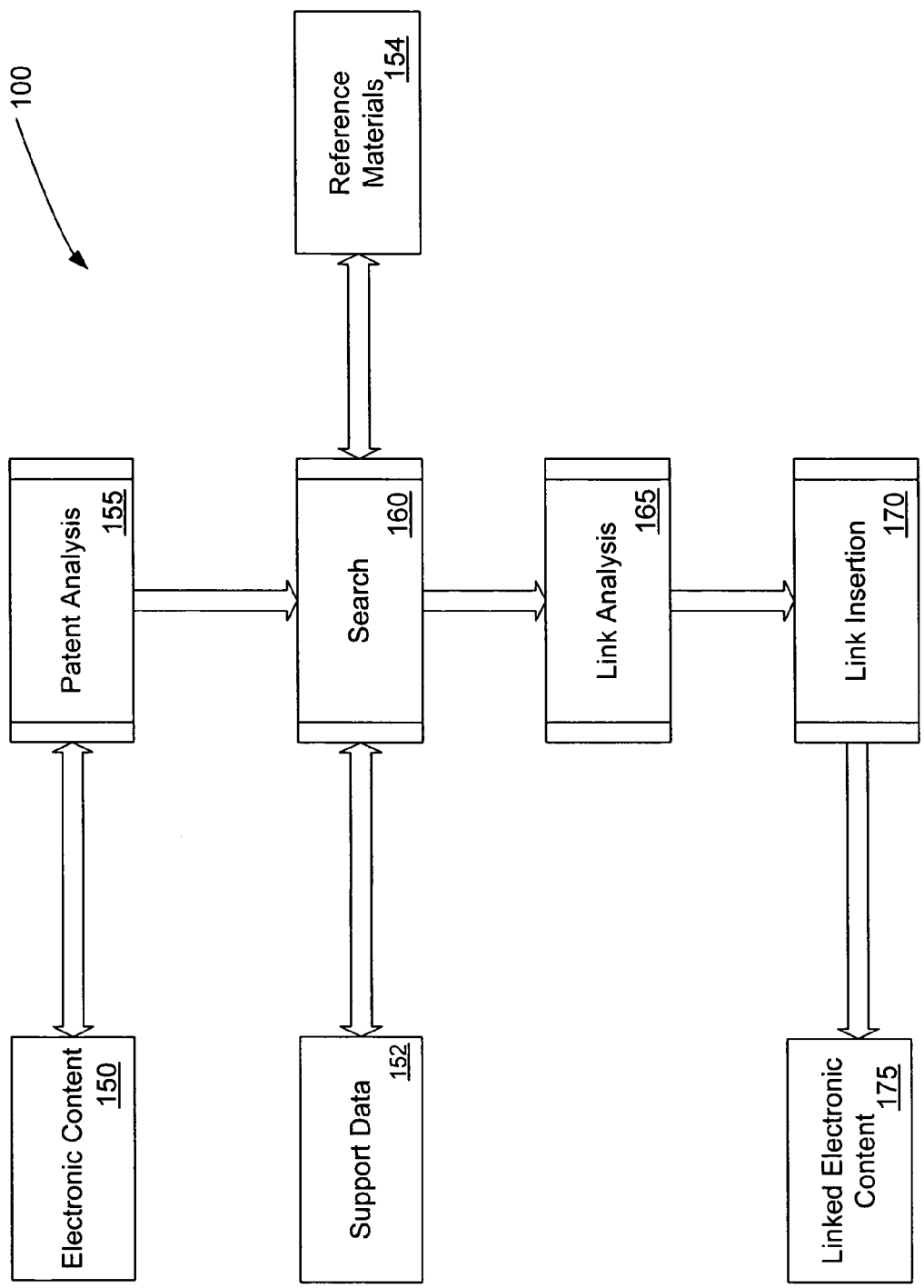
FIG. 2 is a flow diagram of an automated patent office documentation system according to an exemplary embodiment.

FIG. 2 is a flow diagram of one embodiment of the system 100 for inserting electronic associations into patent office documentation. As shown in FIG. 2, the system 100 provides for input from electronic content 150, support data input 152, reference material input 154, a patent analysis module 155, a search module 160, a link analysis module 165, and a link insertion module 170. According to an exemplary embodiment, the search module 160 has access to local servers, databases, and sources of public information, for example, via Internet services.

According to an exemplary embodiment, the patent analysis module 155 analyzes the electronic content 150 to find and identify cite(s) to external references. As examples, among others, the electronic content 150 could be patent information gleaned from an issued patent granted by the PTO, a patent application, or an office action. For an issued patent, the patent information may be considered to include information contained within the issued patent. Examples of patent information for an issued patent are the abstract, the specification, the claims, and the drawings. Locating external references that are cited in the electronic content 150 could be based on identifying such factors as formal citations, patent numbers, domain names, or URLs, among others. Further, fuzzy logic or artificial intelligence could be utilized to effect rule-based analysis.

It should be noted that the system 100 could function as electronic content 150 is created, or with previously existing electronic content 150. For example, with previously existing electronic content 150 such as an office action, the system 100 could process the office action as above and create a version of the office action having electronic associations to cited references. However, the system 100 could also be operable to create electronic associations while a user, e.g., an examiner, creates an office action. Additionally, a user could insert an electronic tag into the electronic content 150, to signify an external reference where one might not otherwise be detectable via the patent analysis module 155, e.g., where an examiner paraphrases a reference.

Upon identification of an external reference by the patent analysis module 155, the search module 160 will proceed to locate the actual external reference. The search module 160 may utilize search engines, web crawlers, or other appropriate search technology. The search module 160 may have access to the electronic content 150, patent support data 152, and reference materials 154. The electronic content 150, as noted previously, is that patent information gleaned from, e.g., an issued patent granted by the PTO, a patent application, or an office action, among others. Patent support data may be considered to include information contained within the prosecution history of the patent. Examples of patent support data or associated PTO information, are PTO office actions, other granted patent or published patent application cited within the issued patent, other issued patents or applications for patent that cite the patent at issue, and PTO classification information. Examples of reference materials include dictionaries, encyclopedias, electronic legal research tools (e.g., NexisLexis and WestLaw), an image/picture library, a video library, a sound library, a music library, and business sources. Many of these information sources would typically be provided to the search module 160 via access to local servers, databases, and sources of public information, for example, via Internet services.

After searching for and locating the external reference, the link analysis module 165 will analyze the external reference to verify that it is the proper reference. The link analysis module 165 will then create an electronic association, such as a hyperlink, that is operable to open the reference and display it either in the same window or in a separate window, as examples. Verification could occur by comparing the title, comparing the citation to the reference, or other appropriate methods as is known in the art. Context analysis or rule-based analysis may also be utilized in the verification of the reference. For example, if the external reference title was close but did not exactly correspond to the title of the located reference, then the context may be examined using keywords or exact quotes from the two references. The external reference would be considered verified if the analysis produced a prescribed confidence level.

The link analysis module 165 may also analyze the reference to identify the portion of the reference to be displayed when the reference is opened by the electronic association. For example, an office action often refers to the page, column, and line number of a patent that is cited as prior art. The relevant page, column, and line number would be used to allow the patent to be opened to the exact location that is relevant to the office action. Alternatively, the reference could be opened at the beginning or top of the reference. Where the external reference is not a patent, the available citation or an exact quote may be utilized to locate the portion of the reference to be displayed. Again, fuzzy logic or artificial intelligence could be utilized to effect rule-based analysis of the electronic content 150 and the external reference in order to locate the relevant portion of the reference. Additionally, the relevant portion of the external reference could be highlighted when it is displayed upon operation of the electronic association.

Often an external reference is cited without specifically identifying the relevant location within the reference. Once the external reference is properly identified, the link analysis module 165 may identify the relevant portion. Both the patent information and the external reference will be analyzed. The link analysis module 165 may, for example, perform context analysis and keyword parsing of the electronic content 150 within the proximity of the citation to the external reference. The resulting information may then be used to analyze the actual external reference in an attempt to identify the relevant portion. If a sufficient confidence level is not obtained during the analysis of the external reference, then the electronic content 150 will be analyzed again using a larger proximity to the cited external reference. The external reference will again be analyzed to determine whether a match to the relevant portion may be identified. The process may be repeated until adequate results are obtained or until a desired confidence level point is deemed unattainable.

The link analysis module 165 may also determine that the cited external references would be more beneficial if a copy were placed in a common location. For example a common location may be desirable where the information is located on a server that is not available during certain time periods. The link analysis module 165 will then create an electronic association to the common location copy of the external reference rather than creating an electronic association to the actual external reference.

Upon creation of an electronic association corresponding to the external reference, the link insertion module 170 will insert an electronic association into the relevant portion of a new version of the electronic content 150, the linked electronic content 175. Of course, multiple electronic associations will be inserted if the same external reference appears in the electronic content 150 more than once. After inserting the appropriate electronic association(s), the process may be repeated until the electronic content 150 has had all desirable external references electronically associated. Again, it should be noted that any reference within the electronic content 150 may be electronically associated by the automated patent office documentation system 100.

Figure 3:
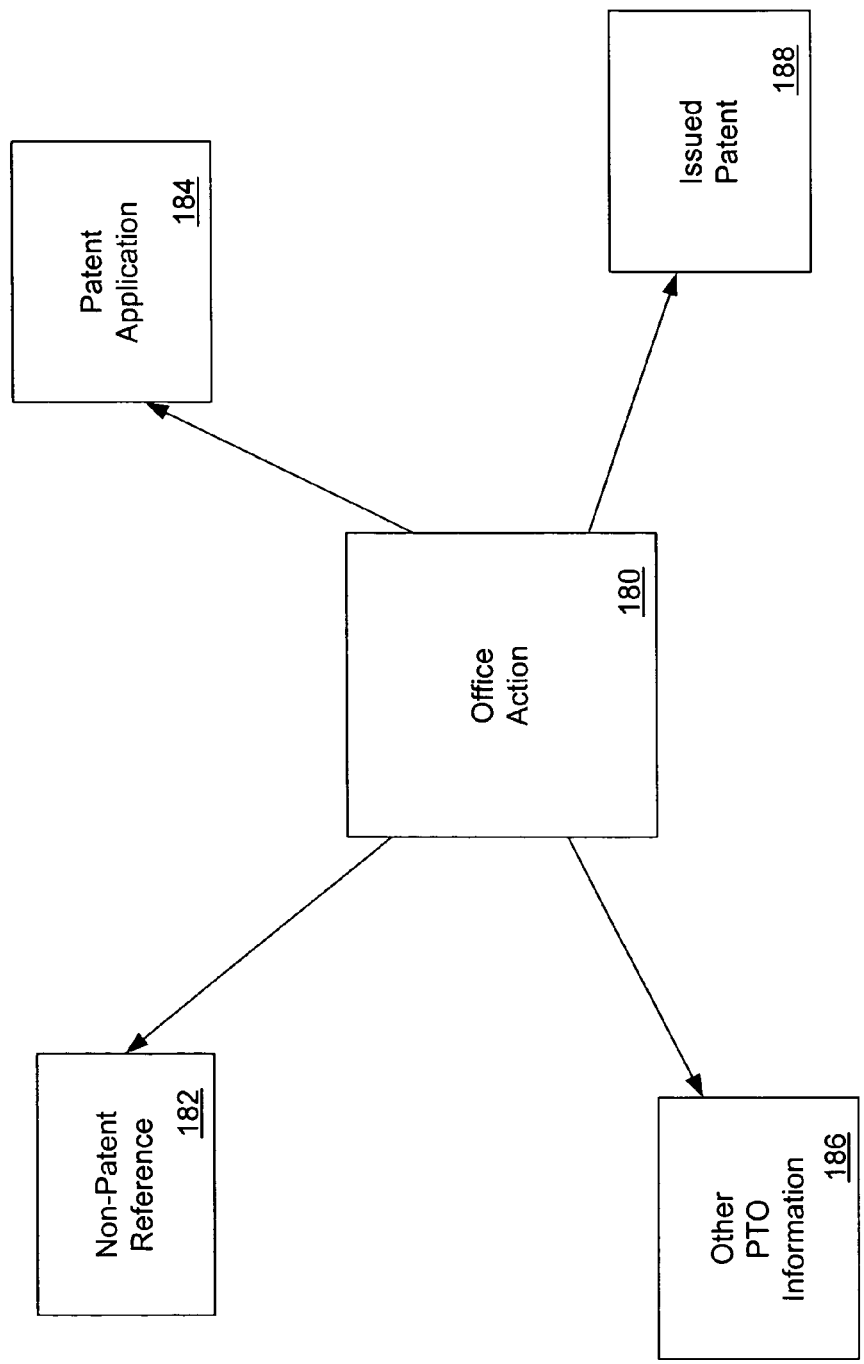
FIG. 3 is an illustration showing various electronic documents linked to an office action.

System 100 can add electronic associations to any document maintained by the PTO, such as patent applications, issued patents, office actions, information disclosure statements, etc. As shown in FIG. 3, the electronic content, an electronic version of a document, may be associated electronically to any other external reference that is cited. FIG. 3 demonstrates that an office action 180 may be electronically associated to a patent application 184, an issued patent 188, a non-patent reference 182, and other PTO information 186. A non-patent reference 182 would include any of the reference materials 154 discussed previously.

Occasionally electronic content 150 such as a patent application 184, or other patent information 186 may contain references for which no electronic version is readily available. Such a reference could readily be scanned and then optical character recognition software could convert the reference into an electronic version suitable for use in the automated office documentation system 100. The electronic version of the scanned document could be stored in the common location discussed previously, and an appropriate electronic association could be created for the reference.

As shown in FIG. 4, a newly linked electronic content 175, such as an office action, may be readily viewed in any conventional web browser, in one embodiment. Any external reference, cited within the electronic content 150, may be electronically associated, in the newly created linked electronic content 175, with the appropriate external reference. The system 100 also allows sections of the patent law to be linked as in FIG. 4, via electronic associations to the United States Code, for example. Additionally, the automated patent office documentation system 100 may provide electronic associations to other PTO resources such as PTO classification information, the Manuel of Patent Examining Procedure (MPEP), or any other materials that could be cited in the electronic content 150.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure.

Therefore, having thus described the disclosure, at least the following is claimed:

1. An automated patent office documentation system comprising:
    a processor; and
    a memory component, the memory component storing:
        patent analysis logic to analyze electronic content, associated patent support data relating to the electronic content, and reference materials, to identify at least one reference to external information, wherein analyzing the electronic content includes determining an identifying characteristic of the referenced external information and at least one desired excerpt in the external information;
        search logic to utilize the identifying characteristic to find the at least one reference to external information;
        link analysis logic to analyze a first proximity of the external information to determine a potentially relevant portion of the external content for the at least one desired excerpt of the external information, the link analysis logic further operable to determine a confidence level that the potentially relevant portion is a relevant portion, the link analysis logic further to, in response to determining that confidence level is below a predetermined threshold, reanalyze the external information with a second proximity, the link analysis logic further to create at least one electronic association corresponding to the determined relevant portion; and insertion logic to insert the at least one electronic association into the electronic content,
    wherein selection of the at least one electronic association facilitates a triggering action resulting in providing a display of the desired excerpt in the referenced external information.

2. The system of claim 1, wherein the electronic content includes at least one of:
    information included in the patent; and
    information included in a prosecution history of the patent; and wherein the patent support data includes at least one of:
    information included in the patent; and
    information included in a prosecution history of the patent; and wherein the reference materials include other public information.

3. The system of claim 1, wherein the search logic has access to at least one of:
    a local server; and
    sources of public information.

4. The system of claim 1, wherein the at least one electronic association is operable to cause the external information to be displayed in at least one of:
    a same window; and
    a separate window.

5. The system of claim 1, wherein the patent analysis logic is to analyze the at least one reference to external information and determine the portion of the external information that is relevant to the electronic content, and is further to cause the portion of the external information that is relevant to the electronic content to be displayed without the need to scroll the displayed information.

6. The system of claim 1, wherein a copy of the external reference is placed in a common location and the electronic association corresponds to the copy rather than to the external reference.

7. An automated method for inserting electronic associations into patent office documentation comprising:
    analyzing electronic content, associated patent support data relating to the electronic content, and reference materials, and identifying at least one reference to external information, wherein analyzing the electronic content includes determining an identifying characteristic of the referenced external information and at least one desired excerpt of the external information;
    searching information systems to utilize the identifying characteristic to find the at least one reference to external information;
    analyzing a first proximity of the external information to determine a potentially relevant portion of the external content for the at least one desired excerpt of the external information;
    determining a confidence level that the potentially relevant portion is a relevant portion;
    in response to determining that confidence level is below a predetermined threshold, reanalyzing the external information with a second proximity;
    creating at least one electronic association corresponding the determined portion; and
    inserting the at least one electronic association into the electronic content,
    wherein selection of the at least one electronic association facilitates a triggering action resulting in providing a display of the desired excerpt in the referenced external information.

8. The method of claim 7, wherein the electronic content includes at least one of:

information included in the patent; and information included in a prosecution history of the patent; and wherein the patent support data includes at least one of information included in the patent; and information included in a prosecution history of the patent; and wherein the reference materials include other public information.

9. The method of claim 7, wherein the search logic has access to at least one of:

a local server; and sources of public information.

10. The method of claim 7, wherein the at least one electronic association causes the external information to be displayed in at least one of:

a same window; and a separate window.

11. The method of claim 7, further comprising analyzing the at least one reference to external information and determining the portion of the external information that is relevant to the electronic content, and further causing the portion of the external information that is relevant to the electronic content to be displayed without the need for scrolling the displayed information.

12. The method of claim 7, further comprising causing a copy of the external reference to be placed in a common location and causing the electronic association to correspond to the copy rather than to the external reference.

13. A computer readable storage medium having a program for inserting electronic associations into patent office documentation, the computer readable medium including a computer program, executed by a processor to:

analyze electronic content, associated patent support data relating to the electronic content, and reference materials, and identifying at least one reference to external information, wherein analyzing the electronic content includes determining an identifying characteristic of the referenced external information and at least one desired excerpt of the external information;

search information systems to utilize the identifying characteristic to find the at least one reference to external information;

analyze a first proximity of the external information to determine a potentially relevant portion of the external content for the at least one desired excerpt of the external information;

determine a confidence level that the potentially relevant portion is a relevant portion;

in response to determining that confidence level is below a predetermined threshold, reanalyze the external information with a second proximity;

creating at least one electronic association corresponding to the determined relevant portion;

determining a location of the at least one desired excerpt in the referenced external information; and inserting the at least one electronic association into the electronic content, wherein selection of the at least one electronic association facilitates a triggering action resulting in providing a display of the desired excerpt in the referenced external information.

14. The computer readable medium of claim 13, wherein the electronic content includes at least one of:

information included in the patent; and information included in a prosecution history of the patent; and wherein the patent support data includes at least one of:

information included in the patent; and information included in a prosecution history of the patent; and wherein the reference materials include other public information.

15. The computer readable medium of claim 13, wherein the search logic has access to at least one of:

a local server; and sources of public information.

16. The computer readable medium of claim 13, wherein the at least one electronic association causes the external information to be displayed in at least one of:

a same window; and a separate window.

17. The computer readable medium of claim 13, further comprising analyzing the at least one reference to external information and determining the portion of the external information that is relevant to the electronic content, and further causing the portion of the external information that is relevant to the electronic content to be displayed without the need for scrolling the displayed information.

18. The computer readable medium of claim 13, further comprising causing a copy of the external reference to be placed in a common location and causing the electronic association to correspond to the copy rather than to the external reference.

* * * * *